United States Patent [19]

Koenzen

[11] Patent Number: 5,796,958
[45] Date of Patent: Aug. 18, 1998

[54] ISDN ADAPTER CARD FOR A COMPUTER

[75] Inventor: Ralf Koenzen, Herzogenrath, Germany

[73] Assignee: ELSA GmbH, Aachen, Germany

[21] Appl. No.: 513,931

[22] PCT Filed: Mar. 8, 1994

[86] PCT No.: PCT/DE94/00245

§ 371 Date: May 14, 1996

§ 102(e) Date: May 14, 1996

[87] PCT Pub. No.: WO94/22271

PCT Pub. Date: Sep. 29, 1994

[30] Foreign Application Priority Data

Mar. 13, 1993 [DE] Germany ............ 93 03 712 U

[51] Int. Cl.$^6$ ............ G06F 13/00; H04Q 11/04; H04M 11/06

[52] U.S. Cl. ............ 395/200.8; 395/841; 395/309; 370/463

[58] Field of Search ............ 395/200.2, 825, 395/827, 840, 841, 200.8, 309; 370/463

[56] References Cited

U.S. PATENT DOCUMENTS

| 4,549,302 | 10/1985 | Heatherington | 375/8 |
|---|---|---|---|
| 5,014,269 | 5/1991 | Picandet | 370/85.11 |
| 5,189,663 | 2/1993 | Williams | 370/17 |
| 5,305,312 | 4/1994 | Fornek et al. | 370/463 |
| 5,363,378 | 11/1994 | Wahl | 370/100.1 |
| 5,379,441 | 1/1995 | Watanabe et al. | 395/800 |
| 5,450,412 | 9/1995 | Takebayashi et al. | 370/95.1 |
| 5,572,675 | 11/1996 | Bergler | 395/200.2 |

Primary Examiner—Mark H. Rinehart
Attorney, Agent, or Firm—Milde, Hoffberg & Macklin, LLP

[57] ABSTRACT

A passive ISDN adapter card includes a serial controller (1) as is normally used to connect an external data transmission device; an ISDN data transmission controller (2) connected to the serial controller and controlled by the CPU of a computer (4); and an ISDN connection controller (3) controlled by the CPU of the computer (4) and connected to the data transmission controller (2). The ISDN adaptor card is compatible with a modem connected to the serial port without an INT-14-H interface for the evaluation process.

15 Claims, 2 Drawing Sheets

ISDN ADAPTER CARD FOR A COMPUTER

BACKGROUND OF THE INVENTION

The invention pertains to a passive ISDN adapter card for data transfer with a computer and to a process for making a passive ISDN adapter card compatible with a data communications device to be run on a serial port of a computer.

By means of passive ISDN adapter cards, computers connected to each other in a wide variety of different ways can exchange information over great distances. Usually a network, a computer, a communications program, and possibly a device for converting the data to the proper form are required for this exchange of data.

If the data are to be transmitted over the telephone lines, for example, modems and acoustic couplers are used to convert the data in the manner required for connecting the personal computer to the telephone network. Before the data can be fed into the telephone network, the digital data in the computer must first be converted into analog data, and then the analog data must to be converted back into digital data at the receiving end. The invention, however, pertains to data transmission over the ISDN network. ISDN standing for "Integrated Services Digital Network". In a network such as this, both active and passive ISDN adapter cards are used; the passive cards differ from the active ones in that they do not have their own processor for handling the communications protocols. The protocols are handled in the case of these passive cards by the CPU (central processing unit) of the terminal (personal computer), which is always present.

So that communication with the connected device, whether this be a modem or an ISDN adapter card, can be carried out successfully, a long-distance data transmission applications program ("communications program") is required. So that the communications programs already existing for modems can continue to be used for passive ISDN cards as well, it is essential that the system for controlling the passive ISDN adapter card be completely compatible with a modem connected to the serial interface of the data terminal.

Only two approaches are known so far in the state of the art for making an ISDN adapter card compatible with a modem connected to the serial port.

The first approach uses an active ISDN PC adapter card, i.e., a card with its own processor. In this case, the ISDN adapter card behaves in fact like an external modem connected to the serial interface. Complete compatibility can be achieved. The active design of the ISDN adapter card, which, in addition to the appropriate peripheral components, also requires a CPU, RAM, and ROM, is frequently neither desirable for cost reasons nor even necessary.

Because ultimately the complete compatibility of the ISDN adapter card with a modem connected to the serial port can be produced only by hardware compatibility with the known serial controllers such as those normally used for connecting to external data communications devices, and because many communications programs respond directly on the register plane to this serial controller, a so-called UART, there is usually no longer any internal software interface which would allow a further evaluation process for monitoring the data stream from the application to the ISDN adapter card and for filtering out the appropriate control information such as the dialing commands.

A conceivable solution would be to resort to the INT 14 H interface in the BIOS. In general, there should be the possibility of "hooking" an evaluation process in at INT 14 H for the control of an ISDN adapter card so that, for example, dialing information could be received.

Because this software interface present in the BIOS is not very powerful, however, it is not supported by most communications programs. They make direct use of the serial controller.

A solution which would be based on the use of INT 14 H would therefore suffer from the disadvantage of not being suitable for all communications programs.

SUMMARY OF THE INVENTION

The invention is therefore based on the task of making a passive ISDN adapter card compatible with a modem connected to a serial port without the need to make any use of the INT 14 H interface for the evaluation process. That is, it was necessary to find a way to send the control information of the applications program existing only on the hardware level to the evaluation process.

The solution is based on the idea of simulating an externally connected data communications device by the use of the processor of the data terminal. In detail, the data communications device is simulated by a serial controller, known in it itself, such as that normally used to turn on an external data communications device; by an ISDN data communications controller, which makes shared use of the CPU of the terminal; and by an ISDN port controller, which is connected to the ISDN data communications controller and makes shared use of the CPU of the terminal.

The term "ISDN data communications controller" refers to the component of an ISDN adapter card which converts the data in such a way that these data can be sent over an ISDN use channel (B channel) or that the data of the use channel received over the ISDN are available for further processing on the adapter card.

Possible ISDN data communications controllers are, for example, the V.110 controller and the HDLC controller.

ISDN data communications controllers usually have an interface to the ISDN and one or more interfaces, e.g., serial and parallel ports, by way of which the data can be prepared for, or received from, the ISDN. To some extent it is also possible for data to be transmitted between these latter two interfaces.

The term "ISDN port controller" refers to the component of an ISDN adapter card which acts as the link between the internal signals of the adapter card and the ISDN port. ISDN ports which can be considered here include, for example, the SO bus, the S2m port, or the UpO port.

The jobs of the ISDN port controller consist essentially of:

generating the ISDN transmission signal to suit the selected port;

preparing the various ISDN transmission channels (use- (B) and control-(D) channels) for other components; and implementing the control channel protocol (D channel) (optional).

The solution is also based on the idea of first receiving the control information of the communications program, which is available first only on the hardware level, on the adapter card by means of the serial controller and of sending it back by way of an ISDN data communications controller to the CPU of the terminal. A control program for the passive ISDN adapter card running there in the background evaluates the control information in order to establish, for example, the corresponding ISDN connections.

Feedback to the communications program travels along the opposite route, i.e., via the ISDN communications controller and the serial controller to the communications program.

In the data transmission phase itself, the data are sent via the ISDN communications controller on the passive ISDN adapter card to the ISDN network and therefore do not require any further processing by the terminal. As a result, the load imposed on the CPU of the terminal is no higher than that which occurs when a modem or an active ISDN adapter card is connected.

The ISDN adapter cards according to the invention are suitable in particular for PC and upwardly-compatible computers. UART's (Universal Asynchronous Receiver/Transmitters) have proven to be especially suitable as serial controllers. The ISDN communications controller preferably complies with CCITT Recommendation V.110.

DETAILED DESCRIPTION OF THE PREFERRED EMBODIMENT

Figure 1:
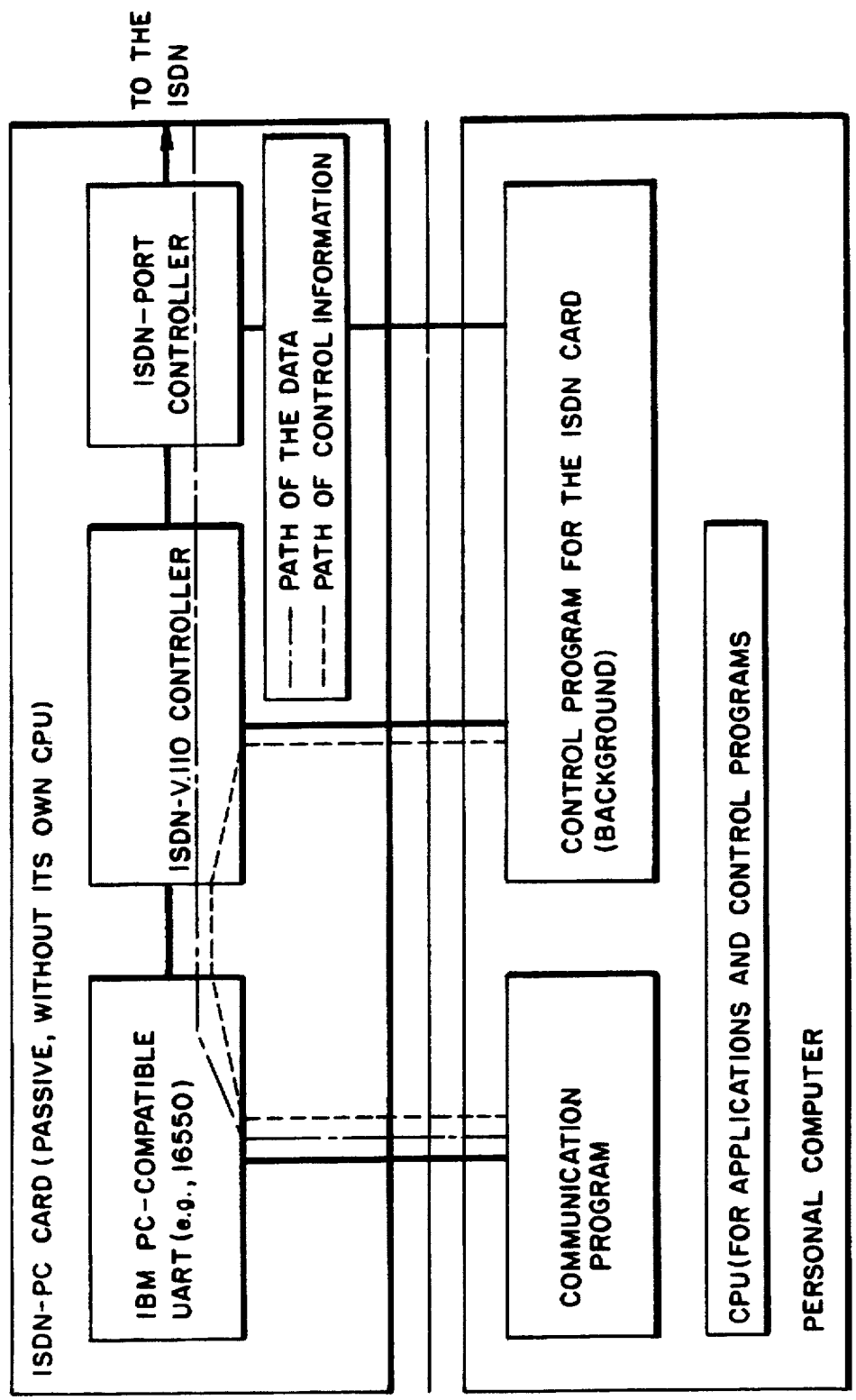
FIG. 1 is a schematic of the ISDN adaptor card connected to a personal computer.

The ISDN adapter card according to the invention consists of a serial controller 1, an ISDN-V.110 controller 2, an ISDN port controller 3, and additional ISDN chips not shown in detail in the block circuit diagram. In addition, the block circuit diagram also shows a personal computer 4 as the data terminal, on which a communications program 5 is running, and on which a control program 6 for the ISDN card is also running in the background. When the communications device simulated by data terminal 4 and components 1, 2, and 3 of the ISDN adapter card is in the command phase, that is, while it is waiting for dialing information, for example, the control data from communications program 5 represented in dotted line in the circuit diagram pass via serial controller 1 and ISDN-V.110 controller 2 to control program 6 for the ISDN adapter card.

After control program 6 has established a connection to the remote station via the ISDN port controller 3, the data of the communications program pass via serial controller 1 and ISDN-V.110 controller 2 directly via ISDN port controller 3 to the ISDN network. There is no need for the CPU of the personal computer to support the data transfer to the ISDN network. The route taken by the data is shown in broken line in the circuit diagram.

Upon completion of the data transfer, the control information shown in dotted line passes again, as described above, to control program 6 running in the background, which can then establish a new ISDN connection, for example.

The basic idea of the invention also includes, of course, designs in which several of the components are combined into an integrated circuit.

Figure 2:
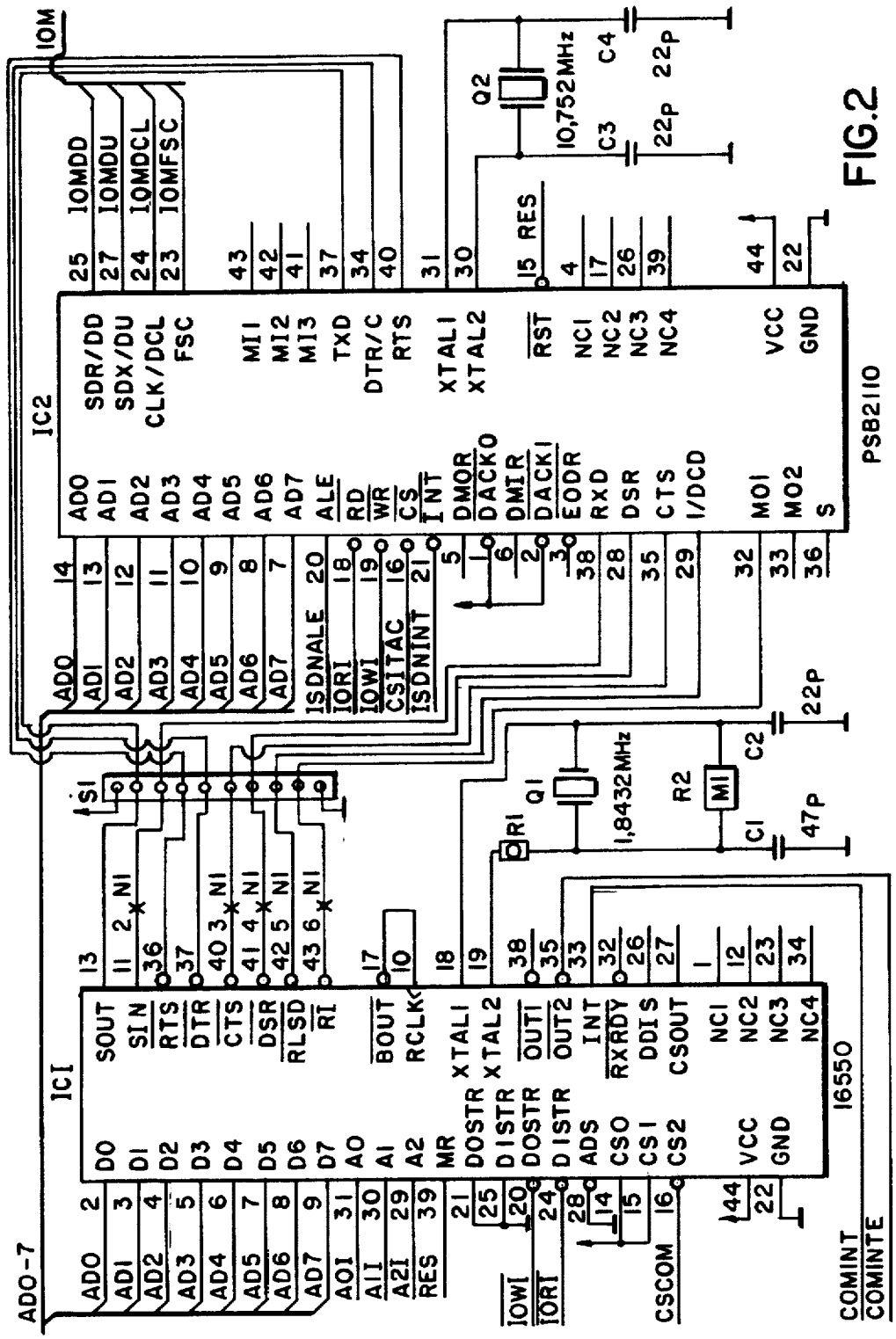
FIG. 2 is a circuit diagram of the ISDN adaptor card.

The circuit diagram shown in FIG. 2 shows the two essential components of the ISDN adapter card according to the invention, namely, the PC-compatible UART referred to as IC1 and the ISDN-B-channel transfer component, designated IC2, to the IOM terminal of which the ISDN port controller is connected (see (3) in FIG. 1). The two components IC1 and IC2 are connected to the address and data bus AD0-7 of the associated IBM-compatible personal computer. The address and interrupt control of the UART (IC1) is accomplished in this case in such a way that it behaves compatibly with a standard serial port of a personal computer.

The control of IC2 proceeds independently of the current applications program means by a control program operating in the background on the personal computer (see (6) in FIG. 1). The V.24 interface of IC1 (SOUT-RI) is connected to the V.24 DTE interface of IC2. A bypass in IC2 then establishes either a direct connection to the ISDN port (V.110 data transfer; online phase) or sends the data over a UART integrated into IC2, which is being operated by the control program running in the background in the command phase.

The only data connection between the applications program and the ISDN network is therefore the hardware V.24 connection between IC1 and IC2.

I claim:

1. Passive ISDN adapter card for data communications with a computer (4) having a CPU, said card comprising:

a serial controller (1) which receives control information and data from a communications program (5) running on the computer (4);

an ISDN communications controller (2), which receives said data and said control information from the serial controller and is controlled by the CPU of the computer (4), and which sends said control information back to the CPU of the computer (4), so that a control program (6) running in the background on the CPU can evaluate said control information and establish an ISDN connection; and an ISDN port controller (3), which is connected to the ISDN controller (2) and controlled by the CPU of the computer (4), said data being sent during a data transfer phase directly to the ISDN network via the serial controller (1), the ISDN communications controller (2), and the ISDN port controller (3).

2. Passive ISDN adapter card according to claim 1, wherein said card is adapted for communications with a communication program of a PC-compatible computer in a mode compatible with analog modem communication.

3. Passive ISDN adapter card according to claim 1 wherein a communications program (5) and a control program (6) for the passive ISDN adapter card are running on the computer (4), with the control program running in the background.

4. Passive ISDN adapter card according to claim 1 wherein a Universal Asynchronous Receiver/Transmitter (UART) is used as the serial controller (1).

5. Passive ISDN adapter card according to claim 1 wherein said ISDN controller is an ISDN-V.110 controller (2).

6. Passive ISDN adapter card according to claim 1 further comprising ISDN integrated circuits for sending the data during the data transfer phase directly to the ISDN network.

7. Process for making a passive ISDN adapter card compatible with a communications device connected to the serial port of a computer having a CPU, wherein an external communications device is simulated by the processor of the computer with the use of said ISDN adapter card, said process comprising:

receiving data and control information from a communications program (5) running on the computer (4) first by a serial controller (1) and then sending said control information back via an ISDN communications controller (2) to the CPU of the computer (4);

a control program (6) running in the background on the CPU of the computer (4) evaluating said control information sent from the ISDN communications controller (2) and establishing the ISDN connection;

sending said data directly to the ISDN network via the serial controller (1), the ISDN communications controller (2), and an ISDN port controller (3) during a data transfer phase; and upon completion of the data transfer phase, sending new control information via the serial controller (1) and the ISDN communications controller (2) to the control program (6) running in the background on the CPU of the computer (4).

8. An ISDN interface card a computer system having a bus, comprising a serial controller receiving an information stream including control information and data from the bus;

an ISDN communications controller, receiving the stream including the control information and data from the serial controller, the control information being presented to the computer system through the bus for evaluation;

and an ISDN port controller, receiving the data from the ISDN communications controller and being controlled by the computer system based an the evaluated control information through the bus.

9. The ISDN interface card according to claim 8, wherein the computer system executes a control program which evaluates the control information received through the bus from the ISDN communications controller and controls the ISDN port controller to set up a communication session.

10. The ISDN interface card according to claim 8, wherein the serial controller comprises a universal asynchronous receiver transmitter.

11. The ISDN interface card according to claim 8, wherein the ISDN communications controller is compliant with V.110.

12. The ISDN interface card according to claim 9, wherein the control information evaluated by the control program comprises modem control information.

13. The ISDN interface card according to claim 8, wherein the control information is modem control information.

14. The ISDN interface card according to claim 8, being substantially without a microcontroller capable of evaluating the control information.

15. The ISDN interface card according to claim 8, wherein the bus is a PC bus.

* * * * *